US011353313B2

United States Patent
Fukumoto et al.

(10) Patent No.: US 11,353,313 B2
(45) Date of Patent: Jun. 7, 2022

(54) POSITION DETECTION DEVICE

(71) Applicant: Panasonic Intellectual Property Management Co., Ltd., Osaka (JP)

(72) Inventors: Ryosuke Fukumoto, Kanagawa (JP); Seigo Yamanaka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 16/558,351

(22) Filed: Sep. 3, 2019

(65) Prior Publication Data

US 2020/0096307 A1 Mar. 26, 2020

(30) Foreign Application Priority Data

Sep. 20, 2018 (JP) .............................. JP2018-176169

(51) Int. Cl.
*G01B 7/004* (2006.01)
*G05G 1/015* (2008.04)
*F16H 59/10* (2006.01)

(52) U.S. Cl.
CPC ............ *G01B 7/004* (2013.01); *G05G 1/015* (2013.01); *F16H 59/105* (2013.01)

(58) Field of Classification Search
CPC ............... G01B 7/004; G05G 1/015; G05G 2009/0474; G05G 2009/04744; G05G 2009/04751; G05G 2009/04755; F16H 59/105; F16H 59/044; F16H 59/0204; H01H 21/285; H01H 36/02; H01H 36/008;

(Continued)

(56) References Cited

U.S. PATENT DOCUMENTS 4,879,556 A * 11/1989 Duimel ................ G01D 5/2073
                                                     341/20
9,671,212 B2 *  6/2017 Iwata ..................... G01D 5/145
(Continued)

FOREIGN PATENT DOCUMENTS

EP    3136056 A1    3/2017
JP    2007223384 A *  9/2007 ........... F16H 59/105
(Continued)

OTHER PUBLICATIONS

German Office Action dated Dec. 14, 2021 for the related German Patent Application No. 102019124072.7, 14 pages, (with English Translation).

*Primary Examiner* — Daniel D Yabut
(74) *Attorney, Agent, or Firm* — Seed IP Law Group LLP

(57) ABSTRACT

A position detection device detects a current positon of a operation member among positions including a predetermined position and includes a detection system that includes a part to be detected and 3N magnetic sensors S. The operation member can move to the positions in N (≥3) different directions from the predetermined position. Movement of the operation member between the predetermined position and another position cause outputs from three of the magnetic sensors to be switched. The magnetic sensors of which outputs are switched by a movement of the operation member between the predetermined position and a first position are all different from the magnetic sensors of which outputs are switched by a movement of the operation member between the predetermined position and a second position.

6 Claims, 10 Drawing Sheets

(58) Field of Classification Search
CPC ... H01H 2036/0086; H01H 2036/0093; G01D 5/24461
See application file for complete search history.

(56) References Cited

U.S. PATENT DOCUMENTS

| | | | | |
|---|---|---|---|---|
| 2005/0126322 | A1* | 6/2005 | Kozaki | F16H 59/105 |
| | | | | 74/335 |
| 2006/0283276 | A1* | 12/2006 | Komatsu | F16H 59/105 |
| | | | | 74/335 |
| 2010/0090689 | A1* | 4/2010 | Furuki | G01D 5/145 |
| | | | | 324/207.24 |
| 2013/0340557 | A1* | 12/2013 | Iwata | G01B 7/14 |
| | | | | 74/473.12 |
| 2014/0020495 | A1 | 1/2014 | Iwata | |
| 2017/0059358 | A1 | 3/2017 | Iwata | |
| 2017/0268656 | A1* | 9/2017 | Onishi | F16H 59/08 |

FOREIGN PATENT DOCUMENTS

| | | | | |
|---|---|---|---|---|
| JP | 2009204340 | A * | 9/2009 | ........... F16H 59/105 |
| JP | 2011105168 | A * | 6/2011 | ......... F16H 59/0204 |
| JP | 2017-045190 | | 3/2017 | |

\* cited by examiner

FIG. 5

|   | 1 | 2 | 3 | 4 | 5 | 6 | 7 | 8 | 9 |
|---|---|---|---|---|---|---|---|---|---|
| M+ | ON | ON | ON | ON | ON | ON |  |  |  |
| H | ON | ON | ON | ON | ON | ON | ON | ON | ON |
| M- | ON | ON | ON |  |  |  | ON | ON | ON |
| R |  |  |  | ON | ON | ON |  |  |  |
| N |  |  |  | ON | ON | ON | ON | ON | ON |
| D |  |  |  |  |  |  | ON | ON | ON |

FIG. 6

|   | M+ | H | M- | R | N | D |
|---|---|---|---|---|---|---|
| M+ | — | 3 | 6 | 3 | 6 | 9 |
| H | 3 | — | 3 | 6 | 3 | 6 |
| M- | 6 | 3 | — | 9 | 6 | 3 |
| R | 3 | 6 | 9 | — | 3 | 6 |
| N | 6 | 3 | 6 | 3 | — | 3 |
| D | 9 | 6 | 3 | 6 | 3 | — |

FIG. 7

| | 1 | 2 | 3 | 4 | 5 | 6 | 7 | 8 | 9 | Decimal number |
|---|---|---|---|---|---|---|---|---|---|---|
| M+ | ON | ON | ON | ON | ON | ON | | | | 504 |
| | ON | ON | ON | ON | ON | ON | | | ON | 505 |
| | ON | ON | ON | ON | ON | ON | | ON | | 506 |
| | ON | ON | ON | ON | ON | ON | | ON | ON | 507 |
| | ON | ON | ON | ON | ON | ON | ON | | | 508 |
| | ON | ON | ON | ON | ON | ON | ON | | ON | 509 |
| | ON | ON | ON | ON | ON | ON | ON | ON | | 510 |
| H | ON | ON | ON | ON | ON | ON | ON | ON | ON | 511 |
| | ON | ON | ON | | | ON | ON | ON | ON | 463 |
| | ON | ON | ON | | ON | | ON | ON | ON | 471 |
| | ON | ON | ON | | ON | ON | ON | ON | ON | 479 |
| | ON | ON | ON | ON | | | ON | ON | ON | 487 |
| | ON | ON | ON | ON | | ON | ON | ON | ON | 495 |
| | ON | ON | ON | ON | ON | | ON | ON | ON | 503 |
| M- | ON | ON | ON | | | | ON | ON | ON | 455 |
| H | ON | ON | ON | ON | ON | ON | ON | ON | ON | 511 |
| | | | ON | ON | ON | ON | ON | ON | ON | 127 |
| | | ON | | ON | ON | ON | ON | ON | ON | 191 |
| | | ON | ON | ON | ON | ON | ON | ON | ON | 255 |
| | ON | | | ON | ON | ON | ON | ON | ON | 319 |
| | ON | | ON | ON | ON | ON | ON | ON | ON | 383 |
| | ON | ON | | ON | ON | ON | ON | ON | ON | 447 |
| N | | | | ON | ON | ON | ON | ON | ON | 63 |
| R | | | | ON | ON | ON | | | | 56 |
| | | | | ON | ON | ON | | | ON | 57 |
| | | | | ON | ON | ON | | ON | | 58 |
| | | | | ON | ON | ON | | ON | ON | 59 |
| | | | | ON | ON | ON | ON | | | 60 |
| | | | | ON | ON | ON | ON | | ON | 61 |
| | | | | ON | ON | ON | ON | ON | | 62 |
| N | | | | ON | ON | ON | ON | ON | ON | 63 |
| | | | | | | ON | ON | ON | ON | 15 |
| | | | | | ON | | ON | ON | ON | 23 |
| | | | | | ON | ON | ON | ON | ON | 31 |
| | | | | ON | | | ON | ON | ON | 39 |
| | | | | ON | | ON | ON | ON | ON | 47 |
| | | | | ON | ON | | ON | ON | ON | 55 |
| D | | | | | | | ON | ON | ON | 7 |

POSITION DETECTION DEVICE

CROSS-REFERENCE TO RELATED APPLICATIONS

This application claims the benefit of foreign priority of Japanese patent application No. 2018-176169, filed on Sep. 20, 2018, the contents all of which are incorporated herein by reference.

BACKGROUND

1. Technical Field

The present disclosure relates to a position detection device that detects a location of an operation member, such as a gearshift lever of a vehicle.

2. Description of the Related Art

For example, an automobile includes a shifter of a shift-by-wire type. The shifter electrically detects movement of a gearshift lever operated by a driver. Based on the detection, a controller of the shifter operates a transmission. As a shift-by-wire type shifter, Japanese Unexamined Patent Publication No. 2017-45190 discloses a position sensor that detects positions of an operation member that moves in a plurality of directions, and secures fail-safe to prevent false detection of one of positions of the operation member.

SUMMARY

A position detection device according to an aspect of the present disclosure detects a current position of an operation member. The operation member is to be moved between a predetermined position and any one of N positions in N different directions different from each other. The current position is one of the predetermined position and one of the N positions. N is an integral number equal to or larger than three. The N positions includes a first position, and a second position different from the first position. The position detection device includes a detection system that includes: a part to be detected; and 3N (that equals N multiplied by three) detectors. Each of 3N detectors has a resolution of one bit that indicates one of two different values according to a positional relationship of the each of the 3N detectors with respect to the part to be detected. The 3N detectors includes three of first detectors and three of second detectors each different from each of the three of first detectors. Each of the three of first detectors is configured to switch an output between the two different values upon movement of the operation member between the predetermined position and the first position. Each of the three of second detectors is configured to switch an output between the two different values upon movement of the operation member between the predetermined position and the second position.

Consequently, even if output from the plurality of detectors switches at different timings in movement of the operation member from one of the positions to another one of the positions, output patterns of signals output from the detectors during the movement can be different from output patterns at a time when the operation member is at the other locations. That is, all output patterns that include output patterns at a time when the operation member is at a location between one of the positions and another one of the positions that is adjacent to the one of the positions can be set to be unique. Therefore, high fail-safe can be secured, and thus false detection of one of the positions of the operation member can be highly suppressed. According to the above configuration, a Hamming distance between any two of the positions is three or more. Therefore, an error can be detected at two digits, and the error can be corrected at one digit. Meanwhile, the output patterns of the signals output from the detectors are referred as detection patterns.

A position detection device according to another aspect of the present disclosure detects a current position of an operation member. The operation member is to be moved between a predetermined position and any one of three positions in three different directions different from each other. The current position is one of the predetermined position and one of the three positions. The three positions includes a first position, and a second position different from the first position. The position detection device includes a detection system that includes: a part to be detected; and nine detectors. Each of nine detectors has resolution of one bit that indicates one of two different values according to a positional relationship of the each of the nine detectors with respect to the part to be detected. The nine detectors includes three of first detectors and three of second detectors each different from each of the three of first detectors. Each of the three of first detectors is configured to switch an output between the two different values upon movement of the operation member between the predetermined position and the first position. Each of the three of second detectors is configured to switch an output between the two different values upon movement of the operation member between the predetermined position and the second position.

Thus, the position detection device detects four positions and can secure high fail-safe, and thus highly suppress false detection of each of the positions. A Hamming distance between any two positions is three or more. Therefore, an error can be detected at two digits, and the error can be corrected at one digit.

The present disclosure can provide a position detection device that can improve fail-safe, and thus highly suppress false position detection caused by an output value at a time when the operation member is at a location between two positions.

BRIEF DESCRIPTION OF DRAWINGS

FIG. 5 is a table showing detection patterns of the position detection device, for the positions of the operation member.

FIG. 6 is a table showing Hamming distances between the positions.

FIG. 7 is a table showing all detection patterns of the position detection device, where the all detection patterns include detection patterns of possible signals output when a gearshift lever is at a location between the positions.

DETAILED DESCRIPTION OF PREFERRED EMBODIMENTS

Prior to describing exemplary embodiments of the present disclosure, problems of conventional devices will be briefly described. A position sensor disclosed in Japanese Unexamined Patent Publication No. 2017-45190 secures fail-safe against failure of detection elements since output of a plurality of detection elements switches when an operation member is moved from one position to another position. In this case, however, all detection elements do not switch outputs at a completely same timing. In fact, there are generally time lags between timings at which the detection elements switches the outputs.

The position sensor disclosed in Japanese Unexamined Patent Publication No. 2017-45190 is not made in light of the time lags. Therefore, unexpected signal patterns may be detected in movement of an operation member from one position to another position. The detection of unexpected signal causes false detection of the position.

The present disclosure provides a position detection device that can improve fail-safe, and thus highly suppress false position detection caused by an output value in movement of an operation member between two positions.

Hereinafter, preferable exemplary embodiments of the present disclosure will be described.

First Exemplary Embodiment

Figure 1:
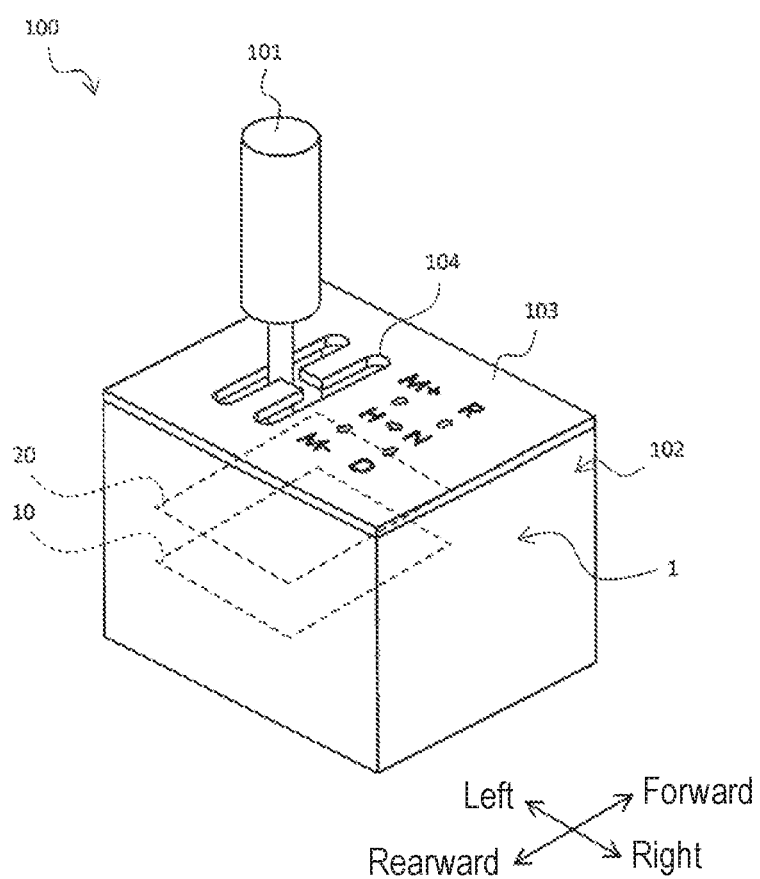
FIG. 1 is a perspective view illustrating an appearance constitution of a shifter to which a position detection device according to a first exemplary embodiment of the present disclosure is applied.

FIG. 1 is a perspective view illustrating an appearance configuration of a shifter to which a position detection device according to a first exemplary embodiment of the present disclosure is applied. As illustrated in FIG. 1, position detection device 1 can be applied to shifter 100 provided in, for example, a center console of a vehicle, such as an automobile. Shifter 100 includes gearshift lever 101 as an operation member to be operated by a driver, and detection unit 102 that accommodates position detection device 1 configured to detect a location of gearshift lever 101. An upper surface of detection unit 102 is provided with shift panel 103. Shift panel 103 is provided with guide slots 104 along which gearshift lever 101 is operated.

Shifter 100 according to the present exemplary embodiment is of an H-type. Guide slots 104 seen from above have a shape like a letter "H". That is, guide slots 104 include a left slot that extends straight in a front-back direction, a right slot that extends straight in the front-back direction, and a center slot that extends straight in a lateral direction. The center slot connects the left and right slots at central portions thereof in the front-back direction. Gearshift lever 101 penetrates guide slots 104. Gearshift lever 101 can be moved between six positions along guide slots 104 in the front-back direction and the lateral direction.

In the left slot, M+ position, H position, and M− position are aligned in this order from a front to a rear of the left slot. In the right slot, R position, N position, and D position are aligned in this order from a front to a rear of the right slot. H position in the left slot and N position in the right slot are at ends of the center slot in guide slots 104. H position is adjacent to N position.

Therefore, shifter 100 allows gearshift lever 101 to be moved from H position to three positions (M+ position, M− position, and N position) in three different directions. Further, shifter 100 allows gearshift lever 101 to be moved from N position to three positions (R position, D position, and H position) in three different directions. Position detection device 1 detects each of all the above possible positions of gearshift lever 101.

On the other hand, detection unit 102 contains printed circuit board 10. A plurality of magnetic sensors S as detectors (see part (a) of FIG. 3) are mounted to an upper surface of printed circuit board 10. Each of magnetic sensors S selectively outputs one of two different values according to a pole of a magnet adjacent to the respective one of magnetic sensors S. Plate-shaped support member 20 is attached to a lower portion of gearshift lever 101. Support member 20 faces printed circuit board 10 from above. Permanent magnet M as a part to be detected (see part (a) of FIG. 3) is attached to a lower surface of support member 20. Therefore, permanent magnet M faces magnetic sensors S from above.

Figure 2:
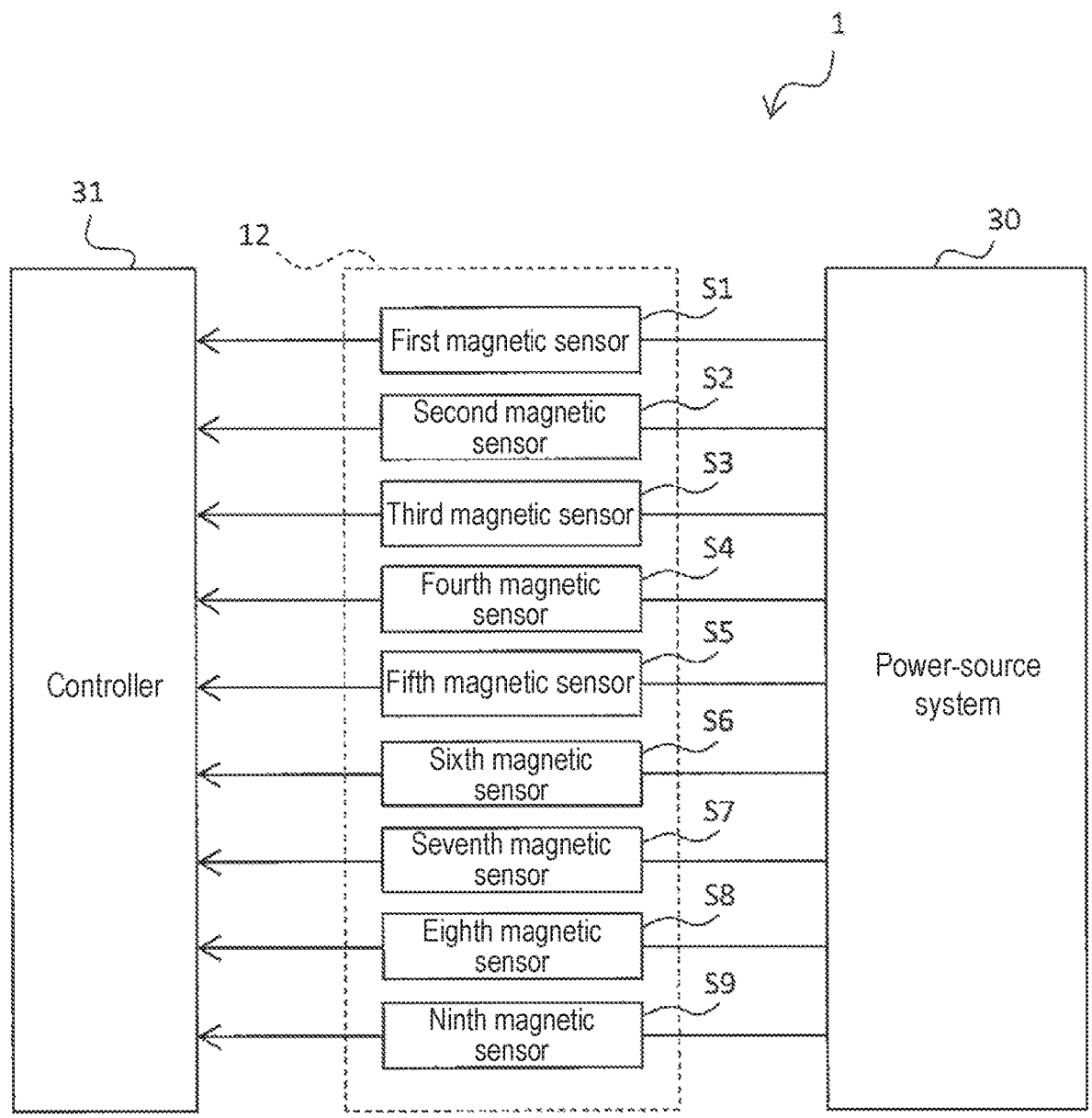
FIG. 2 is a block diagram illustrating an electrical configuration of the position detection device.

FIG. 2 is a block diagram illustrating an electrical configuration of position detection device 1. Position detection device 1 includes detection system 12 that includes nine magnetic sensors S and permanent magnet M, power-source system 30 that supplies electric power to detection system 12, and controller 31 which receives outputs (detected values) from magnetic sensors S. Nine magnetic sensors S include first magnetic sensor S1, second magnetic sensor S2, third magnetic sensor S3, fourth magnetic sensor S4, fifth magnetic sensor S5, sixth magnetic sensor S6, seventh magnetic sensor S7, eighth magnetic sensor S8, and ninth magnetic sensor S9. Controller 31 determines a current position of gearshift lever 101, as described later, based on output from magnetic sensors S, and appropriately operates a transmission of a vehicle.

Position detection device 1 outputs 9-digit detection patterns since position detection device 1 includes nine magnetic sensors S each of which has a resolution of one bit that indicates one of two different values (ON, OFF) according to a positional relationship of the respective one of magnetic sensors S with respect to permanent magnet M.

When gearshift lever 101 moves or shifts between a predetermined position (e.g. H position) and another position adjacent to the predetermined position (e.g. N position, M+ position, or M− position), an output from each of three magnetic sensors S of detection system 12 of position detection device 1 is switched. Furthermore, magnetic sensors S of which outputs are switched by a movement of gearshift lever 101 between the predetermined position (H position) and another position adjacent to the predetermined position (N position, M+ position, or M− position; a first position) are all different from magnetic sensors S of which outputs are switched by the movement of gearshift lever 101 between the above predetermined position to yet another position (second position) that is also adjacent to the above predetermined position. Note that the second position is a position different from the first position among N position, M+ position and M− position.

[Arrangement of Sensors and Disposition of Magnet]

Next, an arrangement of magnetic sensors S and a disposition of permanent magnet M of detection system 12 of position detection device 1 will be exemplified and specifically described with reference to FIG. 3.

Figure 3:
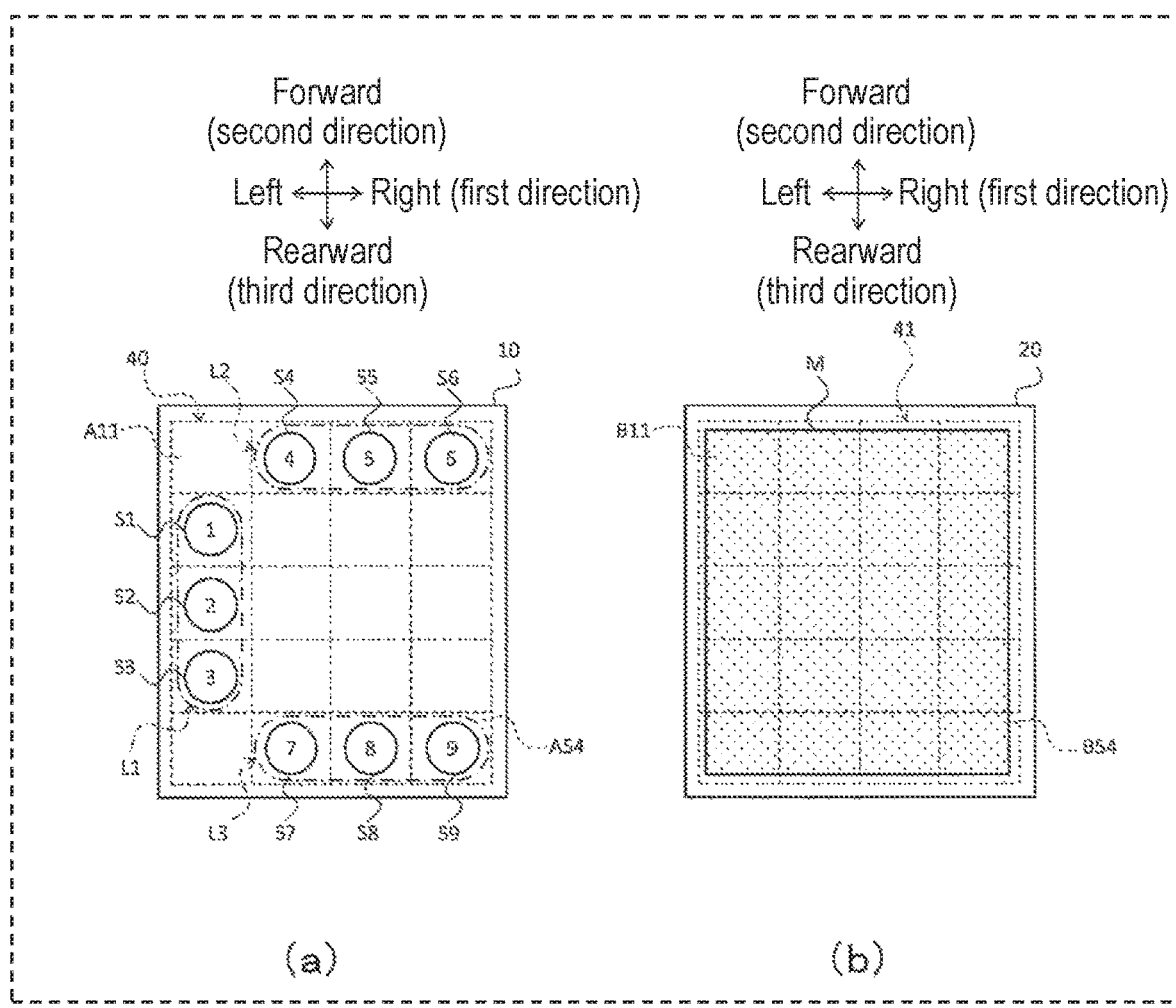
FIG. 3 is a schematic view illustrating a configuration of the position detection device according the first exemplary embodiment, part (a) of FIG. 3 illustrates an arrangement of magnetic sensors on a printed circuit board, and part (b) of FIG. 3 illustrates a disposition of a permanent magnet on a support member.

FIG. 3 is a schematic view illustrating a configuration of position detection device 1. Part (a) of FIG. 3 illustrates an arrangement of magnetic sensors S on printed circuit board 10. Part (b) of FIG. 3 illustrates a disposition of permanent magnet M on support member 20. Part (b) of FIG. 3 substantially illustrates permanent magnet M disposed on a lower surface of support member 20 and seen through support member 20 from above. In part (a) of FIG. 3, icons that are circled numbers 1 to 9 represent first to ninth magnetic sensors S1 to S9, respectively.

Assuming that H position is a predetermined position as described above, gearshift lever 101 of position detection device 1 can move from the predetermined position to N position in a first direction (right), to M+ position in a second direction (forward), or to M− position in a third direction (rearward). Detection system 12 includes a first detection group, a second detection group, and a third detection group. The first detection group includes three magnetic sensors S (first magnetic sensor S1, second magnetic sensor S2, and third magnetic sensor S3) of which outputs are switched by movement of gearshift lever 101 in the first direction. The second detection group includes three magnetic sensors S (seventh magnetic sensor S7, eighth magnetic sensor S8, and ninth magnetic sensor S9) of which outputs are switched by movement of gearshift lever 101 in the second direction. The third detection group includes three magnetic sensors S (fourth magnetic sensor S4, fifth magnetic sensor S5, and sixth magnetic sensor S6) of which output is switched by movement of gearshift lever 101 in the third direction. In other words, first magnetic sensor S1, second magnetic sensor S2, and third magnetic sensor S3 are three of first detectors each of which is configured to switch the output upon movement of gearshift lever 101 between H position as the predetermined position and N position as the first position. Seventh magnetic sensor S7, eighth magnetic sensor S8, and ninth magnetic sensor S9 are three of second detectors each of which is configured to switch the output upon movement of gearshift lever 101 between H position and M+ position as the second position. Fourth magnetic sensor S4, fifth magnetic sensor S5, and sixth magnetic sensor S6 are three of third detectors each of which is configured to switch the output upon movement of gearshift lever 101 between H position and M− position as the third position.

Especially in an example illustrated in FIG. 3, three magnetic sensors S of each of the detection groups align straight and constitute a detection line. That is, first magnetic sensor S1, second magnetic sensor S2, and third magnetic sensor S3 align in the front-back direction perpendicular to the first direction, and constitute first detection line L1. Fourth magnetic sensor S4, fifth magnetic sensor S5, and sixth magnetic sensor S6 align in the lateral direction perpendicular to the second direction, and constitute second detection line L2. Seventh magnetic sensor S7, eighth magnetic sensor S8, and ninth magnetic sensor S9 align in the lateral direction perpendicular to the third direction, and constitute third detection line L3. Second detection line L2 is apart from third detection line L3 in the front-back direction perpendicular to the first direction.

Furthermore, second detection line L2 is apart from first detection line L1 in the second direction (forward), and third detection line L3 is apart from first detection line L1 in the third direction (rearward). Hereinafter, an arrangement in detection system 12 will be more specifically described.

For convenience of explanation, the front-back direction in which gearshift lever 101 moves is also referred to as a column direction, and the lateral direction perpendicular to the front-back direction is also referred to as a row direction. Furthermore, a number of lines that are arranged in the column direction is referred as a number of rows, and a number of lines that are arranged in the row direction is referred as a number of columns. With respect to the arrangement of magnetic sensors S, suppose that matrix 40 is on printed circuit board 10 and includes five rows arranged in the front-back direction (column direction) and four columns arranged in the lateral direction (row direction). A box (region) at row p and column q in matrix 40 is represented by Apq. Therefore, matrix 40 includes 20 regions A11 to A54 (see regions divided by broken lines in part (a) of FIG. 3).

With respect to the disposition of permanent magnet M, suppose that matrix 41 is on support member 20 and includes five rows arranged in the front-back direction (column direction) and four columns arranged in the lateral direction (row direction), as described above. A box (region) at row x and column y in matrix 41 is represented by Bxy. Therefore, matrix 41 includes 20 regions B11 to B54 (see regions divided by broken lines in part (b) of FIG. 3).

Each of the regions of matrix 40 and each of the regions of matrix 41 have a same shape and same dimensions. All regions of matrix 41 overlap all corresponding regions of matrix 40, respectively, when gearshift lever 101 is positioned at H position.

First, an arrangement of magnetic sensors S will be described.

As illustrated in part (a) of FIG. 3, all nine magnetic sensors S are arranged in respective regions of twenty regions A11 to A54 in matrix 40. In other words, any two or more of nine magnetic sensors S are not arranged in the same region.

Concretely, first magnetic sensor S1 is in region A21, second magnetic sensor S2 is in region A31, and third magnetic sensor S3 is in region A41. First magnetic sensor S1, second magnetic sensor S2, and third magnetic sensor S3 align straight in the front-back direction and constitute first detection line L1. Fourth magnetic sensor S4 is in region A12, fifth magnetic sensor S5 is in region A13, and sixth magnetic sensor S6 is in region A14. Fourth magnetic sensor S4, fifth magnetic sensor S5, and sixth magnetic sensor S6 align straight in the lateral direction and constitute second detection line L2. Seventh magnetic sensor S7 is in region A52, eighth magnetic sensor S8 is in region A53, and ninth magnetic sensor S9 is in region A54. Seventh magnetic sensor S7, eighth magnetic sensor S8, and ninth magnetic sensor S9 align straight in the lateral direction and constitute third detection line L3.

Each of magnetic sensors S includes Hall effect integrated circuit (IC), for example. Each of magnetic sensors S has a resolution of one bit that indicates one of two different values according to a positional relationship of respective one of magnetic sensors S with respect to permanent magnet M, as described above. Concretely, each of magnetic sensors S is configured to detect a south pole. When magnetic sensor S is opposite a south pole, magnetic sensor S outputs an ON signal. Alternatively, if magnetic sensor S is not opposite a south pole or is opposite a north pole, magnetic sensor S outputs an OFF signal. Alternatively, magnetic sensors S may detect a north pole.

Next, a disposition of permanent magnet M will be described.

As illustrated in part (b) of FIG. 3, permanent magnet M of a south pole is formed on support member 20. Concretely, permanent magnet M of a south pole is attached to whole matrix 41 of support member 20, that is all twenty regions B11 to B54 divided by five rows and four columns (a dotted area in part (b) of FIG. 3). In order to highly suppress false detection, a permanent magnet of a north pole is attached to support member 20 on a portion that excludes regions B11 to B54 (portion that surrounds regions B11 to B54). The portion may be simply made of a non-magnetic body. For visibility, an area to which permanent magnet M is attached is slightly smaller than matrix 41 in part (b) of FIG. 3. However, the area to which permanent magnet M is attached and matrix 41 may have same dimensions. Alternatively, the area to which permanent magnet M is attached may be slightly larger than matrix 41.

[Operation of Position Detection Device]

Figure 4:
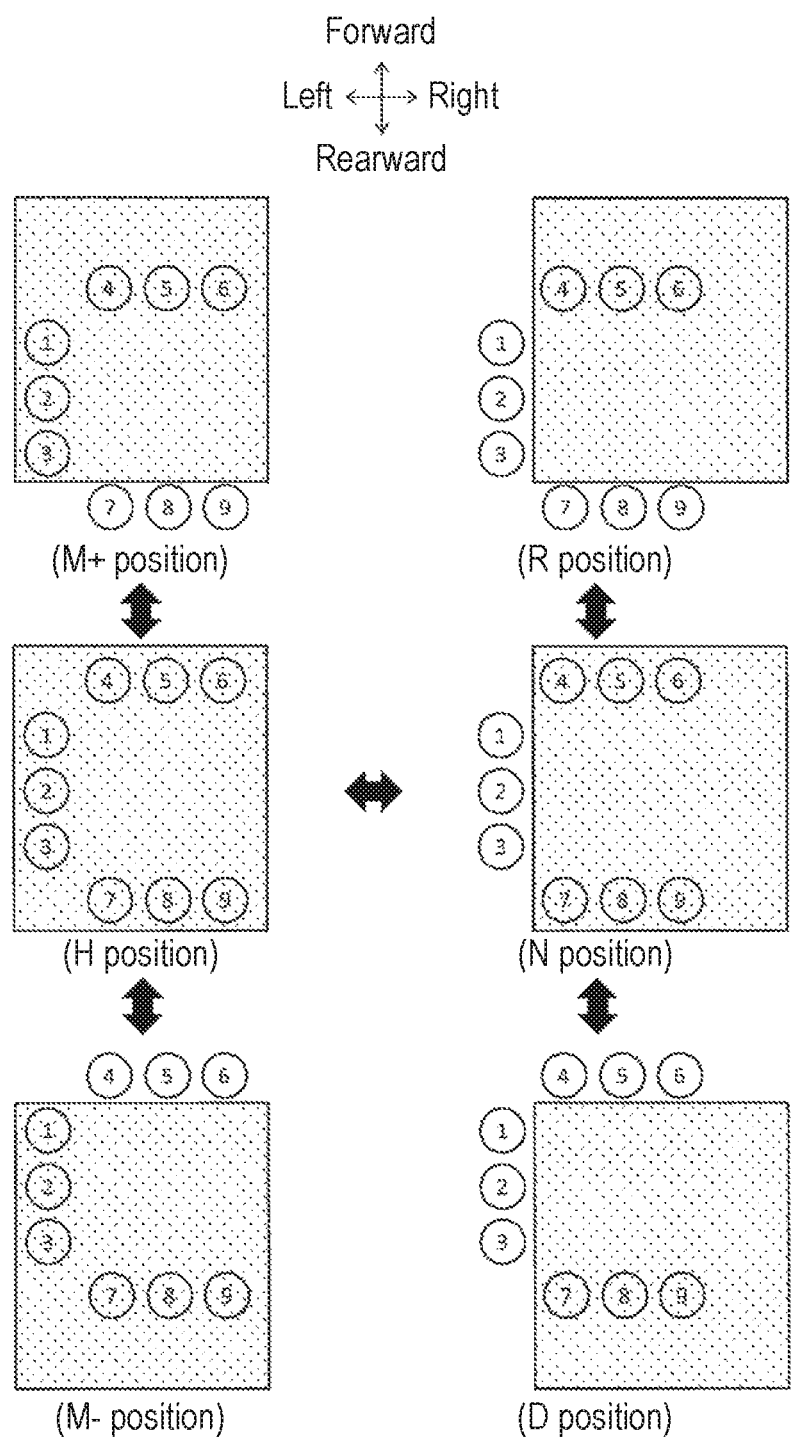
FIG. 4 is a schematic view illustrating locations of the magnetic sensors with respect to a location of the permanent magnet, for positions of an operation member, according to the exemplary embodiment.

Next, locations of magnetic sensors S with respect to permanent magnet M and detection patterns will be described for each of the positions of gearshift lever 101. FIG. 4 is a schematic view illustrating locations of magnetic sensors S with respect to permanent magnet M, for each of the positions. FIG. 5 is a table showing detection patterns of position detection device 1, for each of the positions. In FIG. 4, only magnetic sensors S and permanent magnet M of a south pole are illustrated, and printed circuit board 10, support member 20, and matrices 40, 41 are not illustrated.

When gearshift lever 101 is at H position, matrix 41 covers matrix 40 so that the locations of matrices 40 and 41 are the same viewed from above, as described above. At that time, all magnetic sensors S (first to ninth magnetic sensors S1 to S9) are opposite respective regions of permanent magnet M of a south pole. Consequently, a detection pattern in this case contains ON signals output from all magnetic sensors S, as shown in a second row in FIG. 5.

In the table in FIG. 5, letters M+, H, M−, R, N, and D that are vertically aligned indicate six respective positions of gearshift lever 101. Numbers 1 to 9 that are laterally aligned indicate first to ninth magnetic sensors S1 to S9, respectively. Each cell in the table contains a signal (ON or OFF) output from corresponding one of magnetic sensors S in a case of a corresponding one of the positions. However, for visibility, only "ON" is shown and "OFF" is not shown in the table.

Next, when gearshift lever 101 is at M+ position, support member 20 is located at a front position (in the second direction) with respect to printed circuit board 10 by one region from H position. Consequently, six magnetic sensors S that are first to sixth magnetic sensors S1 to S6 are opposite permanent magnet M of a south pole. On the other hand, three magnetic sensors S that are seventh to ninth magnetic sensor S7 to S9 are not opposite permanent magnet M of a south pole. Consequently, a detection pattern in this case contains ON signals output from first to sixth magnetic sensors S1 to S6, and OFF signals output from seventh to ninth magnetic sensors S7 to S9, as shown in a first row of the table in FIG. 5.

When gearshift lever 101 is at M− position, support member 20 is located at a rear position (in the third direction) with respect to printed circuit board 10 by one region from H position. Consequently, six magnetic sensors S that are first to third magnetic sensors S1 to S3 and seventh to ninth magnetic sensors S7 to S9 are opposite permanent magnet M of a south pole. On the other hand, three magnetic sensors S that are fourth to sixth magnetic sensors S4 to S6 are not opposite permanent magnet M of a south pole. Consequently, a detection pattern in this case contains ON signals output from first to third magnetic sensors S1 to S3 and seventh to ninth magnetic sensors S7 to S9, and OFF signals output from fourth to sixth magnetic sensors S4 to S6, as shown in a third row of the table in FIG. 5.

When gearshift lever 101 is at N position, support member 20 is located at a right position (in the first direction) with respect to printed circuit board 10 by one region from H position. Consequently, six magnetic sensors S that are fourth to ninth magnetic sensors S4 to S9 are opposite permanent magnet M of a south pole. On the other hand, three magnetic sensors S that are first to third magnetic sensors S1 to S3 are not opposite permanent magnet M of a south pole. Consequently, a detection pattern in this case contains ON signals output from fourth to ninth magnetic sensors S4 to S9, and OFF signals output from first to third magnetic sensors S1 to S3, as shown in a fifth row of the table in FIG. 5.

When gearshift lever 101 is at R position, support member 20 is located at a front position (in the second direction) with respect to printed circuit board 10 by one region from N position. Consequently, three magnetic sensors S that are fourth to sixth magnetic sensors S4 to S6 are opposite permanent magnet M of a south pole. On the other hand, six magnetic sensors S that are first to third magnetic sensors S1 to S3 and seventh to ninth magnetic sensors S7 to S9 are not opposite permanent magnet M of a south pole. Consequently, a detection pattern in this case contains ON signals output from fourth to sixth magnetic sensors S4 to S6, and OFF signals output from first to third magnetic sensors S1 to S3 and seventh to ninth magnetic sensors S7 to S9, as shown in a fourth row of the table in FIG. 5.

If gearshift lever 101 is at D position, support member 20 is located at a rear position (in the third direction) with respect to printed circuit board 10 by one region from N position. Consequently, three magnetic sensors S that are seventh to ninth magnetic sensor S7 to S9 are opposite permanent magnet M of a south pole. On the other hand, six magnetic sensors S that are first to sixth magnetic sensors S1 to S6 are not opposite permanent magnet M of a south pole. Consequently, a detection pattern in this case contains ON signals output from seventh to ninth magnetic sensors S7 to S9, and OFF signals output from first to sixth magnetic sensors S1 to S6, as shown in a sixth row of the table in FIG. 5.

[Advantageous Effects]

Since position detection device 1 is configured as described above, position detection device 1 secures a minimum Hamming distance of "three". Therefore, an error is detected at two digits, and the error is corrected at one digit.

The "Hamming distance" is a well-known term in a field of communication. The Hamming distance between two code words a=(a1, a2, . . . an) and b=(b1, b2, . . . bn) is a number of corresponding bits (digits) at which values (e.g. 1 and 0, or ON and OFF) are different. For example, between two code words a=(1, 0, 0) and b=(0, 1, 0), values are different at two digits, and values are the same at one digit. Therefore, a Hamming distance between code words a, b is "2". If a Hamming distance between any two code words is equal to or larger than t+1, at most t errors in the code words can be detected. If a Hamming distance between any two code words is equal to or larger than 2t+1, at most t errors in the code words can be corrected.

FIG. 6 is a table showing Hamming distances between the positions of gearshift lever 101. As shown in FIG. 5, in the detection patterns in which gearshift lever 101 is at H position and at M+ position, respectively, for example, output (ON) from first to sixth magnetic sensors S1 to S6. On the other hand, output from seventh to ninth magnetic sensors S7 to S9 in the case of H position is different from output from seventh to ninth magnetic sensors S7 to S9 in the case of M+ position. Therefore, a Hamming distance between H position and M+ position is "three", as shown in FIG. 6.

As shown in FIG. 6, position detection device 1 according to the first exemplary embodiment secures a minimum Hamming distance of "three". Therefore, t=2 for error detection, and thus at most two errors in output can be detected. Further, t=1 for error correction, and thus at most one error in output can be corrected. Consequently, position detection device 1 secures fail-safe against failure of magnetic sensors S.

Further, position detection device 1 according to the first exemplary embodiment does not cause false detection, since an output value at a time when gearshift lever 101 is at a location between any two of the positions is a unique value.

FIG. 7 is a table showing all detection patterns of position detection device 1 that include detection patterns of possible signals output at a time when gearshift lever 101 is at a location between two of the positions. In FIG. 7, each of detection patterns at the six positions is surrounded by a rectangular border, and the detection patterns are same as those shown in FIG. 5. In addition, possible detection patterns of signals detected at locations each between two of the positions are shown between a detection pattern at one of the two positions and a detection pattern at the position adjacent to the one of the two positions.

As shown in FIG. 7, detection patterns of two adjacent positions differ in three magnetic sensors S. Therefore, there are six possible patterns of switch of output from three magnetic sensors S at a time during movement of gearshift lever 101. In FIG. 7, output values from three magnetic sensors S that switch the outputs thereof when gearshift lever 101 moves between two adjacent positions are shown in bold italic.

For example, when gearshift lever 101 moves from H position to N position, the output values from three magnetic sensors that are first to third magnetic sensors S1 to S3 switch from ON to OFF. That is, output values from first to third magnetic sensors S1 to S3 switch from (ON, ON, ON) to (OFF, OFF, OFF). There are six possible signal patterns output from three magnetic sensors S in the movement. The six possible signal patterns are (OFF, OFF, ON), (OFF, ON, OFF), (OFF, ON, ON), (ON, OFF, OFF), (ON, OFF, ON), and (ON, ON, OFF), as shown in FIG. 7.

Similarly, when gearshift lever 101 moves between H position and M+ position, between H position and M- position, between N position and R position, or between N position and D position, there are also six possible signal patterns output from three magnetic sensors S as shown in FIG. 7. A comparison between any one of the detection patterns and another one of the detection patterns shows that all detection patterns of position detection device 1 according to the present exemplary embodiment are unique patterns. Therefore, any one of the detection patterns is different from others of the detection patterns.

Consequently, when gearshift lever 101 moves from one of the positions to another one of the positions, a current location of gearshift lever 101 (one of the positions, or a location between two of the positions) can be determined based on successively detected signal patterns, irrespective of timings of switches of three magnetic sensors S. Therefore, position detection device 1 can highly suppress false position detection caused by output values at a time when gearshift lever 101 is at a location between two of the positions.

Suppose that the detection patterns are 9-bit binary numbers. The 9-bit binary numbers are converted into decimal numbers. FIG. 7 shows the decimal numbers to the right of the corresponding detection patterns, respectively, for easy comparison of the detection patterns.

Further, position detection device 1 according to the first exemplary embodiment is set such that the outputs from all magnetic sensors S in a normal state are the same (ON) in a case of H position that is one position of the six positions, as illustrated in FIG. 4 (see FIG. 5). Even if an error occurs at any of magnetic sensors S, the error can be easily detected based on the outputs at a time when gearshift lever 101 is at H position.

Such a configuration is suitably applied to a position detection device of a gearshift lever of a shifter of a momentary-action type, for example. The shifter of a momentary-action type is configured such that the gearshift lever automatically returns to a predetermined neutral location (e.g. H position (original position)) in every time after a user operates the gearshift lever. Therefore, setting of all magnetic sensors S to output a same value when the gearshift lever is at the neutral location allows errors to be more easily detected.

Modified Examples

Figure 8:
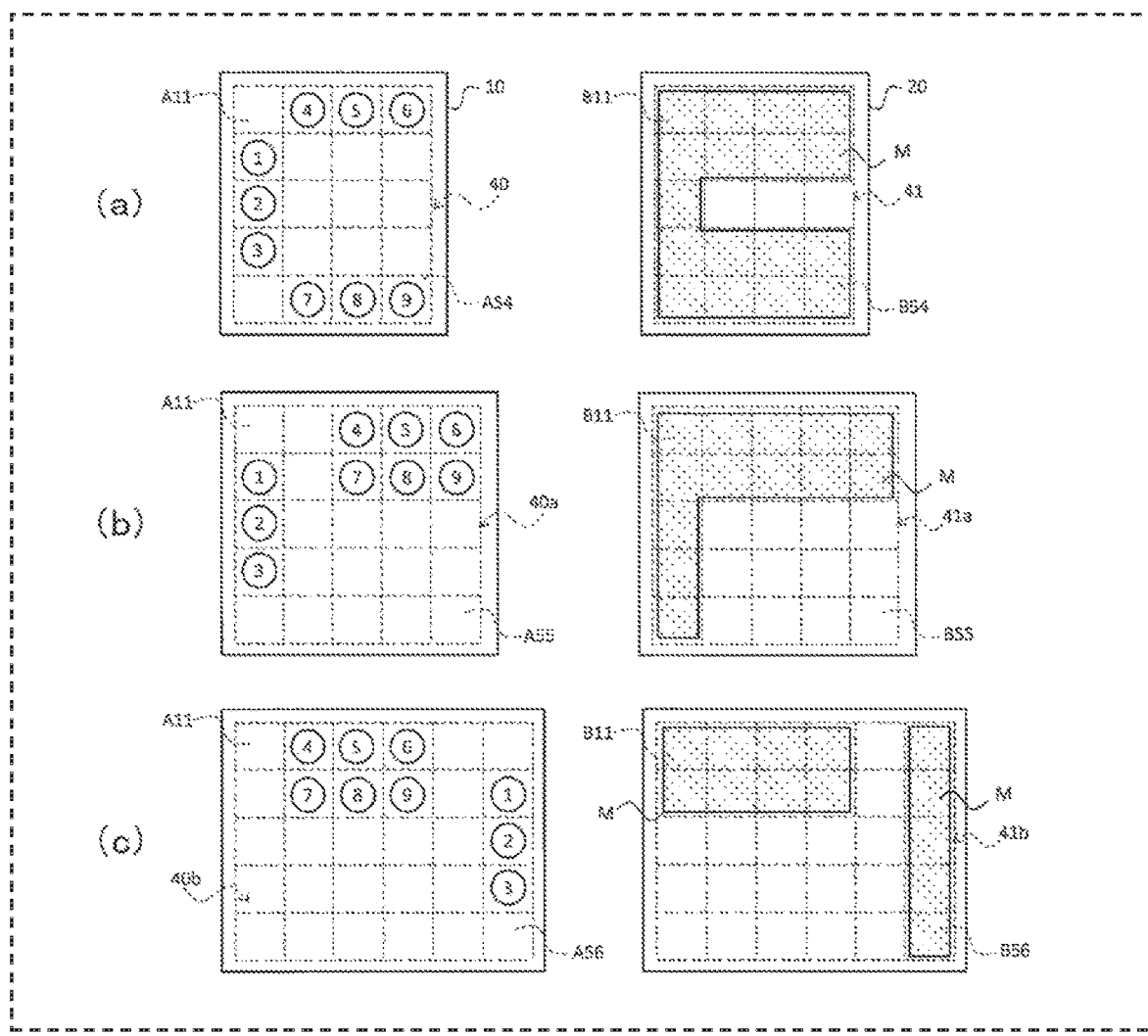
FIG. 8 is a schematic view illustrating other configurations of detection systems applicable to a position detection device of a shifter that is an H-type.
Figure 9:
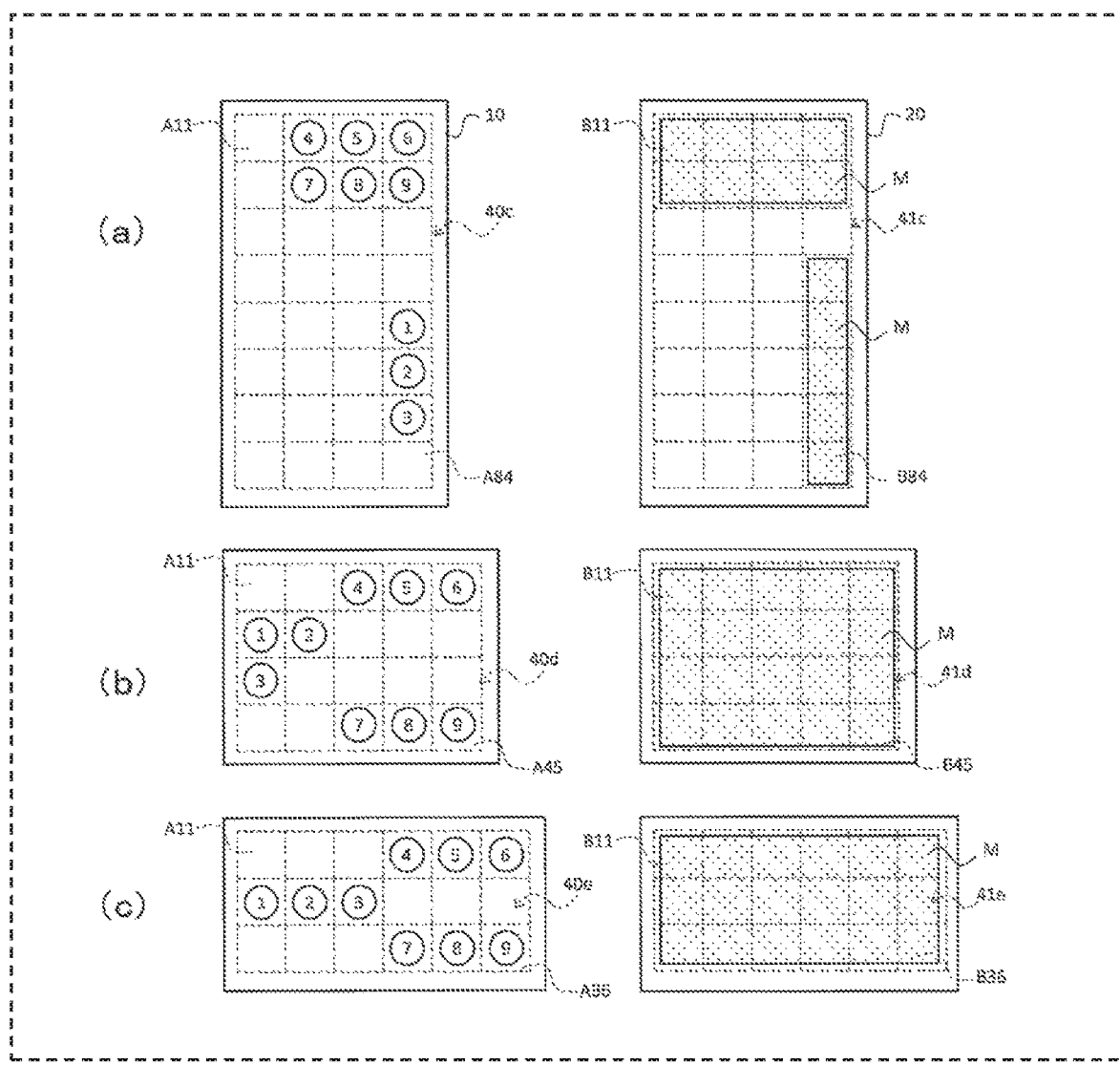
FIG. 9 is a schematic view illustrating further other configurations of detection systems applicable to a position detection device of a shifter that is an H-type.

The configuration of position detection device 1 applicable to above-mentioned shifter 100 of an H-type is not limited to the above configuration. That is, in detection system 12, magnetic sensors S may be differently arranged, and permanent magnet M 12 may be differently disposed. FIGS. 8 and 9 are schematic views illustrating other configurations of detection systems applicable to position detection device 1 of shifter 100 of an H-type. FIGS. 8 and 9 illustrate configurations at a time when gearshift lever 101 is at H position.

Magnetic sensors S of a detection system illustrated in part (a) of FIG. 8 are arranged in matrix 40 that includes five rows and four columns, similarly as magnetic sensors S illustrated in part (a) of FIG. 3. Magnetic sensors S illustrated in part (a) of FIG. 8 are arranged in matrix 40 in a positional relationship same as that of magnetic sensors S illustrated in part (a) of FIG. 3. On the other hand, permanent magnet M of a south pole of the detection system illustrated in part (a) of FIG. 8 is disposed on an area that excludes regions B32, B33, and B34 of matrix 41. Matrix 41 includes five rows and four columns, similarly as matrix 41 illustrated in part (b) of FIG. 3. Regions B32, B33, and B34 may be made of a non-magnetic body. Alternatively, in order to highly suppress false detection, a permanent magnet of a north pole may be disposed on regions B32, B33, and B34.

In a detection system shown in part (b) of FIG. 8, nine magnetic sensors S are arranged in matrix 40a that is on printed circuit board 10 and includes five rows and five columns. That is, first magnetic sensor S1 is disposed on region A21, second magnetic sensor S2 is on region A31, and third magnetic sensor S3 is on region A41. Fourth magnetic sensor S4 is on region A13, fifth magnetic sensor S5 is on region A14, and sixth magnetic sensor S6 is on region A15. Seventh magnetic sensor S7 is on region A23, eighth magnetic sensor S8 is on region A24, and ninth magnetic sensor 9S is on region A25.

On the other hand, permanent magnet M of a south pole is disposed on predetermined region B in matrix 41a of support member 20 and including five rows and five columns. That is, in matrix 41a, permanent magnet M of a south pole is disposed on a whole first row (five regions A11 to A15 that are continuous in the lateral direction), on a whole second row (five regions A21 to A25 that are continuous in the lateral direction), and on regions A31, A41, and A51. The other area on matrix 41a may be made of a non-magnetic body. Alternatively, in order to highly suppress false detection, a permanent magnet of a north pole may be disposed on the other area on matrix 41a.

In a detection system shown in part (c) of FIG. 8, nine magnetic sensors S are arranged in matrix 40b that is on printed circuit board 10 and includes five rows and six columns. That is, first magnetic sensor S1 is disposed on region A26, second magnetic sensor S2 is on region A36, and third magnetic sensor S3 is on region A46. Fourth magnetic sensor S4 is on region A12, fifth magnetic sensor S5 is on region A13, and sixth magnetic sensor S6 is on region A14. Seventh magnetic sensor S7 is on region A22, eighth magnetic sensor S8 is on region A23, and ninth magnetic sensor S9 is on region A24.

On the other hand, permanent magnets M of a south pole are disposed on predetermined regions B of matrix 41b that is on support member 20 and includes five rows and six columns. That is, in matrix 41b, one of permanent magnets M of a south pole is disposed on four regions B11 to B14 of a first row that are continuous in the lateral direction, and four regions B21 to B24 of a second row that are continuous in the lateral direction. The other permanent magnet M of a south pole is disposed on four regions B16 to B56 of a sixth column that are continuous in the front-back direction. The other area on matrix 41b may be made of a non-magnetic body. Alternatively, in order to highly suppress false detection, a permanent magnet of a north pole may be disposed on the other area on matrix 41b.

In a detection system shown in part (a) of FIG. 9, nine magnetic sensors S are arranged in matrix 40c that is on printed circuit board 10 and includes eight rows and four columns. That is, first magnetic sensor S1 is disposed on region A54, second magnetic sensor S2 is on region A64, and third magnetic sensor S3 is on region A74. Fourth magnetic sensor S4 is on region A12, fifth magnetic sensor S5 is on region A13, and sixth magnetic sensor S6 is on region A14. Seventh magnetic sensor S7 is on region A22, eighth magnetic sensor S8 is on region A23, and ninth magnetic sensor 9S is on region A24.

On the other hand, permanent magnets M of a south pole are disposed on predetermined regions B of matrix 41c that is on support member 20 and includes eight rows and four columns. That is, in matrix 41c, one of permanent magnets M of a south pole is disposed on a whole first row (four regions B11 to B14 that are continuous in the lateral direction), and a whole second row (four regions B21 to B24 that are continuous in the lateral direction). The other permanent magnet M of a south pole is disposed on five regions B44 to B84 of a fourth column that are continuous in the front-back direction. The other area on matrix 41c may be made of a non-magnetic body. Alternatively, in order to highly suppress false detection, a permanent magnet of a north pole may be disposed on the other area on matrix 41c.

In a detection system shown in part (b) of FIG. 9, nine magnetic sensors S are arranged in matrix 40d that is on printed circuit board 10 and includes four rows and five columns. That is, first magnetic sensor S1 is disposed on region A21, second magnetic sensor S2 is on region A22, and third magnetic sensor S3 is on region A31. Fourth magnetic sensor S4 is on region A13, fifth magnetic sensor S5 is on region A14, and sixth magnetic sensor S6 is on region A15. Seventh magnetic sensor S7 is on region A43, eighth magnetic sensor S8 is on region A44, and ninth magnetic sensor S9 is on region A45.

On the other hand, permanent magnet M of a south pole is disposed on a predetermined region B of matrix 41d that is on support member 20 and includes four rows and five columns. That is, in matrix 41d, permanent magnet M of a south pole is disposed on all twenty regions B11 to B45 divided by four rows and five columns. According to the detection system illustrated in part (b) of FIG. 9, when gearshift lever 101 moves between H position and N position, support member 20 necessarily moves with respect to printed circuit board 10 by a distance that corresponds to two regions A.

In a detection system shown in part (c) of FIG. 9, nine magnetic sensors S are arranged in matrix 40e that is on printed circuit board 10 and includes three rows and six columns. That is, first magnetic sensor S1 disposed is on region A21, second magnetic sensor S2 is on region A22, and third magnetic sensor S3 is on region A23. Fourth magnetic sensor S4 is on region A14, fifth magnetic sensor S5 is on region A15, and sixth magnetic sensor S6 is on region A16. Seventh magnetic sensor S7 is on region A34, eighth magnetic sensor S8 is on region A35, and ninth magnetic sensor S9 is on region A36.

On the other hand, permanent magnet M of a south pole is disposed on a predetermined region B of matrix 41e that is on support member 20 and includes three rows and six columns. That is, in matrix 41e, permanent magnet M of a south pole is disposed on all eighteen regions B11 to B36 divided by three rows and six columns. According to the detection system illustrated in part (c) of FIG. 9, when gearshift lever 101 moves between H position and N position, support member 20 necessarily moves with respect to printed circuit board 10 by a distance that corresponds to three regions A.

Position detection device 1 that includes a detection system of any one of the configurations illustrated in parts (a) to (c) of FIG. 8 and parts (a) to (c) of FIG. 9 described above has advantageous effects that are similar to those of detection system 12 illustrated in FIG. 3. That is, a detection system of any one of the configurations secures a minimum Hamming distance of "three". Therefore, at most two errors in output can be detected, and at most one error in output can be corrected.

Further, when gearshift lever 101 moves from any one of the positions to another one of the positions, a current location of gearshift lever 101 (one of the positions, or a location between two of the positions) can be determined based on successively detected signal patterns, irrespective of timings of switches of three magnetic sensors S. Therefore, position detection device 1 that includes any one of the detection systems can highly suppress false position detection caused by output values at a time when gearshift lever 101 is at a location between two of the positions.

Second Exemplary Embodiment

Figure 10:
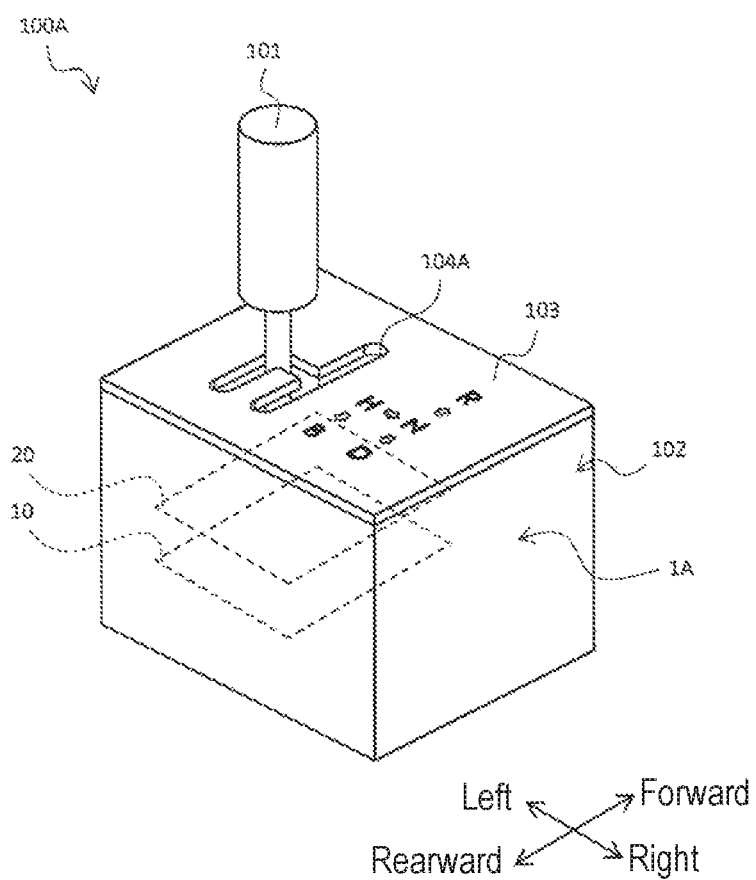
FIG. 10 is a perspective view illustrating an appearance configuration of a shifter to which a position detection device according to a second exemplary embodiment is applied.

FIG. 10 is a perspective view illustrating an appearance configuration of a shifter to which position detection device 1A according to a second exemplary embodiment is applied.

Hereinafter, shifter 100A according to the second exemplary embodiment will be described. Difference between shifter 100A and shifter 100 according to the first exemplary embodiment will be mainly described. That is, elements similar to those in shifter 100 have the same reference marks as those in the first exemplary embodiment, and details descriptions thereof may be omitted.

Shifter 100A according to the present exemplary embodiment is of an h-type. Guide slots 104A seen from above have a shape like a letter "h" (correctly, a shape of a letter "h" of which left and right are reversed). Gearshift lever 101 penetrates guide slots 104A. Gearshift lever 101 can be moved between five positions along guide slots 104A in a front-back direction and a lateral direction.

In the left slot, H position and B position align in this order from a front to a rear. In the right slot, R position, N position, and D position align in this order from a front to a reart. H position and N position are at respective ends of a center slot of guide slots 104 that extends in the lateral direction. H position is adjacent to N position.

Therefore, gearshift lever 101 of shifter 100A can move from N position to three positions (H position, R position, and D position) in three different directions. Gearshift lever 101 can move from H position to two positions (N position and B position) in two different directions. Position detection device 1A detects any one of all the above possible positions of gearshift lever 101.

On the other hand, detection unit 102 contains printed circuit board 10. Nine magnetic sensors S as detectors are mounted to an upper surface of printed circuit board 10. Each of magnetic sensors S selectively outputs one of two different values according to a pole of a magnet adjacent to the respective one of magnetic sensors S. Plate-shaped support member 20 is attached to a lower portion of gearshift lever 101. Support member 20 faces printed circuit board 10 from above. Permanent magnet M as a part to be detected is attached to a lower surface of support member 20. Therefore, permanent magnet M faces magnetic sensors S from above. An electrical configuration of position detection device 1A may be similar to a configuration in the block diagram of FIG. 2 illustrated in the first exemplary embodiment. Therefore, the electrical configuration of position detection device 1A will not be described.

Position detection device 1A outputs 9-digit detection patterns since position detection device 1A includes nine magnetic sensors S each of which has a resolution of one bit that indicates one of two different values (ON, OFF) according to a positional relationship of the respective one of magnetic sensors S with respect to permanent magnet M.

When gearshift lever 101 moves or shifts between a predetermined position (N position) and another position adjacent to the predetermined position (H position, R position, or D position), an output from each of three magnetic sensors S of a detection system of position detection device 1A is switched. Furthermore, magnetic sensors S of which output are switched by a movement of gearshift lever 101 between the predetermined position (N position) and another position (H position, R position, or D position; first position) adjacent to the predetermined position are all different from magnetic sensors S of which outputs are switched by a movement of gearshift lever 101 between the above predetermined position and another position (second position) that is also adjacent to the above predetermined position. Note that the second position is a position different from the first position among H position, R position and D position.

Next, an arrangement of magnetic sensors S and a disposition of permanent magnet M of the detection system of position detection device 1A will be exemplified and specifically described with reference to FIG. 11.

Figure 11:
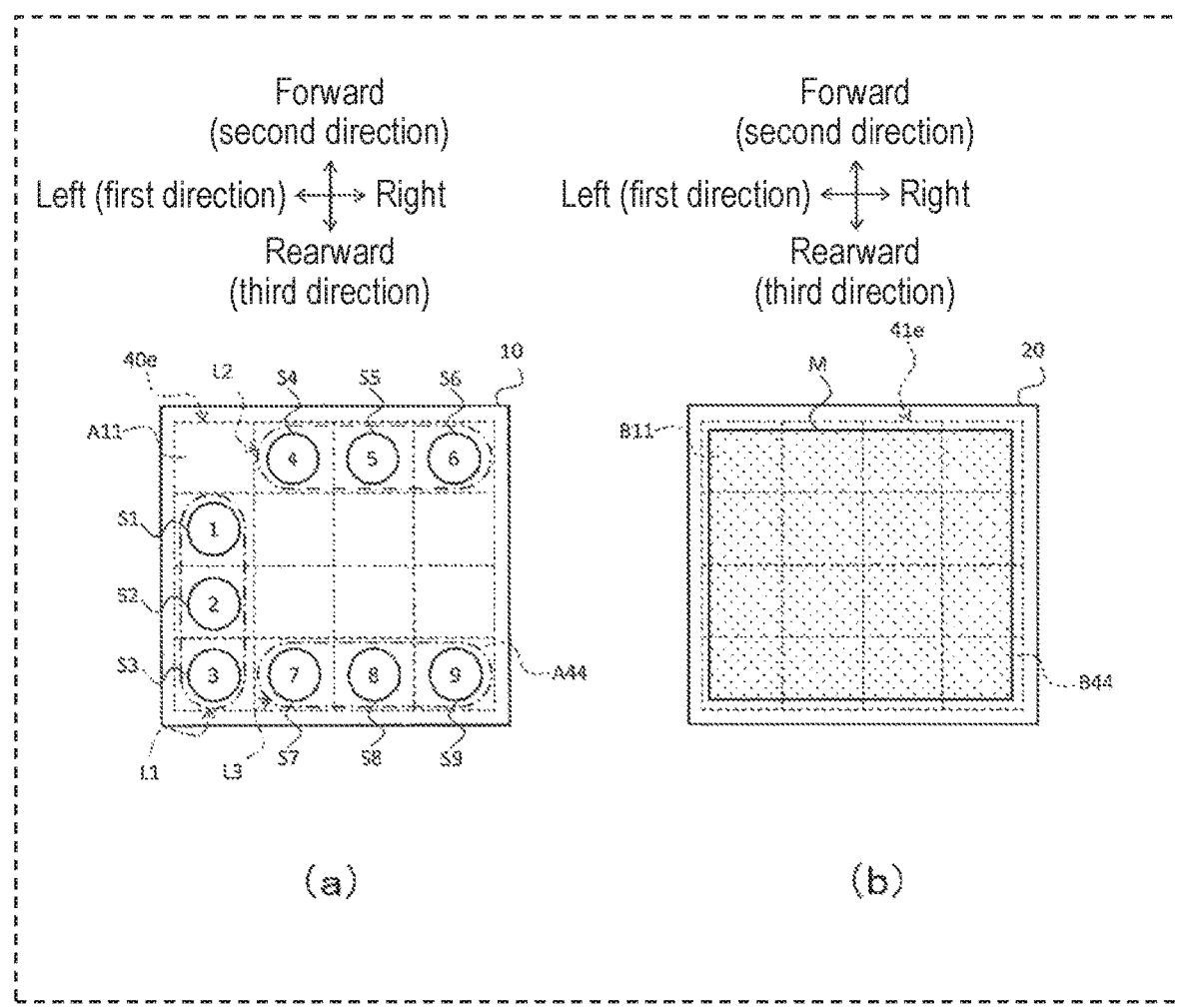
FIG. 11 is a schematic view illustrating a configuration of the position detection device according the second exemplary embodiment, part (a) of FIG. 11 illustrates an arrangement of magnetic sensors on a printed circuit board, and part (b) of FIG. 11 illustrates a disposition of a permanent magnet on a support member.

FIG. 11 is a schematic view illustrating a configuration of position detection device 1A. Part (a) of FIG. 11 illustrates an arrangement of magnetic sensors S on printed circuit board 10. Part (b) of FIG. 11 illustrates a disposition of permanent magnet M on support member 20. With respect to the arrangement of magnetic sensors S, suppose that matrix 40e is on printed circuit board 10 and includes four rows and four columns. With respect to the disposition of permanent magnet M, suppose that matrix 41e is on support member 20 and includes four rows and four columns. Regions A of matrix 40e and regions B of matrix 41e have a same shape and same dimensions. When gearshift lever 101 is positioned at H position, all regions of matrix 41e overlap all corresponding regions of matrix 40e, respectively.

Assuming that N position is a predetermined position as described above, gearshift lever 101 of position detection device 1A can move from the predetermined position to H position in a first direction (left), to R position in a second direction (forward), or to D position in a third direction (rearward). The detection system includes a first detection group, a second detection group, and a third detection group as the same as in the first exemplary embodiment.

Also same as in the first exemplary embodiment, in an example in FIG. 11, three magnetic sensors S of each of the detection groups align straight and constitute a detection line. That is, first magnetic sensor S1, second magnetic sensor S2, and third magnetic sensor S3 constitute first detection line L1. Fourth magnetic sensor S4, fifth magnetic sensor S5, and sixth magnetic sensor S6 constitute second detection line L2. Seventh magnetic sensor S7, eighth magnetic sensor S8, and ninth magnetic sensor S9 constitute third detection line L3. Second detection line L2 is apart from third detection line L3 in the front-back direction perpendicular to the first direction.

Further, second detection line L2 is apart from first detection line L1 in the second direction (forward), and third detection line L3 overlaps first detection line L1 viewed along the first direction. Hereinafter, an arrangement of the detection system will be more specifically described.

As illustrated in part (a) of FIG. 11, all nine magnetic sensors S are arranged in respective regions of sixteen regions A11 to A44 in matrix 40e. In other words, any two or more of nine magnetic sensors S are not arranged in the same region.

Concretely, first magnetic sensor S1 is in region A21, second magnetic sensor S2 is in region A31, and third magnetic sensor S3 is in region A41. First magnetic sensor S1, second magnetic sensor S2, and third magnetic sensor S3 align straight in the front-back direction and constitute first detection line L1. Fourth magnetic sensor S4 is in region A12, fifth magnetic sensor S5 is in region A13, and sixth magnetic sensor S6 is in region A14. Fourth magnetic sensor S4, fifth magnetic sensor S5, and sixth magnetic sensor S6 align straight in the lateral direction and constitute second detection line L2. Seventh magnetic sensor S7 is in region A42, eighth magnetic sensor S8 is in region A43, and ninth magnetic sensor S9 is in region A44. Seventh magnetic sensor S7, eighth magnetic sensor S8, and ninth magnetic sensor S9 align straight in the lateral direction and constitute third detection line L3.

As illustrated in part (b) of FIG. 11, permanent magnet M of a south pole is formed on support member 20. Concretely, permanent magnet M of a south pole is attached to whole matrix 41e of support member 20, that is all sixteen regions B11 to B44 divided by four rows and four columns (a dotted area in part (b) of FIG. 11). In order to highly suppress false detection, a permanent magnet of a north pole is attached to support member 20 on a portion that excludes regions B11 to B44 (portion that surrounds regions B11 to B44). The portion may be simply made of a non-magnetic body. For visibility, an area to which permanent magnet M is attached is slightly smaller than matrix 41e in part (b) of FIG. 11. However, the area to which permanent magnet M is attached and matrix 41e may have same dimensions. Alternatively, the area to which permanent magnet M is attached may be slightly larger than matrix 41e.

Position detection device 1A thus configured has advantageous effects similar to those of position detection device 1 according to the first exemplary embodiment. That is, the detection system of position detection device 1A secures a minimum Hamming distance of "three". Therefore, at most two errors in output can be detected, and at most one error in output can be corrected.

When gearshift lever 101 moves between one of the positions to another one of the positions, the outputs of only three magnetic sensors S are switched at the time of completion of the movement. Further, a current location of gearshift lever 101 (one of the positions, or a location between two of the positions) can be determined based on successively detected signal patterns, irrespective of timings of switches of three magnetic sensors S in the movement of gearshift lever 101 from one of the positions to another one of the positions. Therefore, position detection device 1A that includes the detection system can highly suppress false position detection caused by output values at a time when gearshift lever 101 is at a location between two of the positions.

In the above description, a position detection device according to one aspect of the present disclosure is applied to a shifter of an H-type and a shifter of an h-type. However, shifters to which a position detection device according to one aspect of the present disclosure can be applied are not limited to the shifter of an H-type and a shifter of an h-type. For example, a position detection device according to one aspect of the present disclosure may be applied to a shifter of a T-type that includes an operation member movable from a predetermined position to any of three positions in three different directions. Examples of configurations of shifters of a T-type includes a configuration in which B position is omitted from shifter 100A according to the second exemplary embodiment.

As described above, a position detection device according to an aspect of the present disclosure detects a current position of an operation member. The operation member is to be moved between a predetermined position and any one of three positions in three different directions different from each other. The current position is one of the predetermined position and one of the three positions. The three positions includes a first position, and a second position different from the first position. The position detection device includes a detection system that includes: a part to be detected; and nine detectors. Each of nine detectors has resolution of one bit that indicates one of two different values according to a positional relationship of the each of the nine detectors with respect to the part to be detected. The nine detectors includes three of first detectors and three of second detectors each different from each of the three of first detectors. Each of the three of first detectors is configured to switch an output between the two different values upon movement of the operation member between the predetermined position and the first position. Each of the three of second detectors is configured to switch an output between the two different values upon movement of the operation member between the predetermined position and the second position.

Thus, the position detection device detects four positions and can secure high fail-safe, and thus highly suppress false detection of each of the positions. A Hamming distance between any two positions is three or more. Therefore, an error can be detected at two digits, and the error can be corrected at one digit. The present disclosure is not limited to a position detection device that detects four positions, but includes a position detection device that detects five or more positions as long as the position detection device includes the above configuration.

Furthermore, the nine detectors may further include three of third detectors each different from each of the three of first detectors and the three of second detectors, and the three positions may further includes a third position different from the first position and the second position. In this case, the three of third detectors may be configured to switch an output between the two different values upon movement of the operation member between the predetermined position and the third position. According to the configuration, the position detection device detects four positions and can secure high fail-safe, and thus highly suppress false detection of each of the positions.

In addition, the three directions may include a first direction, a second direction perpendicular to the first direction, and a third direction that is opposite to the second direction. The first direction may extend from the predetermined position to the first position, the second direction may extend from the predetermined position to the second position, and the third direction may extend from the predetermined position to the third position. Consequently, a concrete configuration of a position detection device can be provided that secures high fail-safe, and thus highly suppress false detection of the operation member that can be moved from the predetermined position to positions in three directions: a lateral direction, a forward direction, and a rearward direction.

The three directions may include a first direction, a second direction perpendicular to the first direction, and a third direction opposite to the second direction. The detection system may include a first detection line disposed along a direction perpendicular to the first direction, a second detection line disposed along a direction perpendicular to the second direction, and a third detection line disposed along a direction perpendicular to the third direction and parallel to the second detection line. In the first detection line, the three of first detectors are aligned straight. In the second detection line, the three of third detectors are aligned straight. In the third detection line, the three of second detectors are aligned straight. The second detection line is apart from the third detection line in the direction perpendicular to the first direction.

Consequently, a position detection device having small dimensions as a whole as well as the above advantageous effects can be provided.

The second detection line may be apart from the first detection line in the second direction, and the third detection line may be apart from the first detection line in the third direction.

Consequently, dimensions of a whole position detection device that detects the current position of the operation member movable between six positions arranged in a shape like a letter "H" can be smaller. Furthermore, a configuration that includes a magnet, for example, as the detected part, can be simple.

The second detection line may be apart from the first detection line in the second direction, and the third detection line may overlap the first detection line viewed along the first direction. Alternatively, the third detection line may be apart from the first detection line in the third direction, and the second detection line may overlap the first detection line viewed along the first direction.

Consequently, dimensions of a whole position detection device that detects the current position of the operation member movable between five positions arranged in a shape like a letter "h" can be smaller. Furthermore, a configuration that includes a magnet, for example, as the detected part, can be simple.

Directions in which an operation member can move from a predetermined position are not limited to three directions. For example, the position detection device according to one aspect of the present disclosure may be applied to a shifter that includes an operation member movable in four or more directions. Also in such a case, the position detection device can highly suppress false position detection caused by output values at a time when the operation member is at a location between two of the positions.

A position detection device in this case detects a current position of an operation member. The operation member is movable between a predetermined position and any one of N positions in N different directions different from each other. The current position is one of the predetermined position and one of the N positions. N is an integral number equal to or larger than three. The N positions includes a first position, and a second position different from the first position. The position detection device includes a detection system that includes: a part to be detected; and 3N (that equals N multiplied by three) detectors. Each of 3N detectors has a resolution of one bit that indicates one of two different values according to a positional relationship of the each of the 3N detectors with respect to the part to be detected. The 3N detectors includes three of first detectors and three of second detectors each different from each of the three of first detectors. Each of the three of first detectors is configured to switch an output between the two different values upon movement of the operation member between the predetermined position and the first position. Each of the three of second detectors is configured to switch an output between the two different values upon movement of the operation member between the predetermined position and the second position. A position detection device that includes such a configuration can achieve the same advantageous effects as those described above.

Consequently, even if output from the plurality of detectors switches at different timings in movement of the operation member from one of the positions to another one of the positions, output patterns of signals output from the detectors during the movement can be different from output patterns at a time when the operation member is at the other locations. That is, all output patterns that include output patterns at a time when the operation member is at a location between one of the positions and another one of the positions that is adjacent to the one of the positions can be set to be unique. Therefore, high fail-safe can be secured, and thus false detection of one of the positions of the operation member can be highly suppressed. According to the above configuration, a Hamming distance between any two of the positions is three or more. Therefore, an error can be detected at two digits, and the error can be corrected at one digit. Meanwhile, the output patterns of the signals output from the detectors are referred as detection patterns.

In the above aspect, a total number of the detectors may be at least 3N. Therefore, the detection system may include 3N or more detectors. If a number of the detectors is 3N or more, three or more detectors may switch in movement of the operation member from one of the positions to another position one of the position.

The present disclosure can be applied to, for example, a position detection device for a shifter operated by a driver in a vehicle, such as an automobile.

What is claimed is:

1. A position detection device configured to detect a current position of a operation member, the operation member being configured to be moved between a predetermined position and any one of three positions located in three directions different from each other, respectively, the three directions include a first direction, a second direction perpendicular to the first direction, and a third direction that is opposite to the second direction, the current position being one of the predetermined position and one of the three positions, the three positions including a first position, a second position different from the first position and a third position different from the first position and the second position, the position detection device comprising a detection system that includes:
a part to be detected;
nine detectors each having a resolution of one bit that indicates one of two different values according to a positional relationship of the each of the nine detectors with respect to the part to be detected, the nine detectors includes three first detectors, three second detectors each different from each of the three first detectors, and three third detectors each different from each of the three first detectors and the three second detectors, each of the three first detectors is configured to switch an output between the two different values upon movement of the operation member between the predetermined position and the first position, each of the three second detectors is configured to switch an output between the two different values upon movement of the operation member between the predetermined position and the second position, and each of the three third detectors is configured to switch an output between the two different values upon movement of the operation member between the predetermined position and the third position;
a first detection line disposed along a direction perpendicular to the first direction, and, in the first detection line, the three first detectors are aligned straight;
a second detection line along a direction perpendicular to the second direction, and, in the second detection line, the three third detectors are aligned straight;
a third detection line along a direction perpendicular to the third direction and parallel to the second detection line, and, in the third detection line, the three second detectors are aligned straight;
wherein the second detection line is apart from the third detection line in the direction perpendicular to the first direction.

2. The position detection device according to claim 1, wherein:
the first direction extends from the predetermined position to the first position,
the second direction extends from the predetermined position to the second position, and the third direction extends from the predetermined position to the third position.

3. The position detection device according to claim 1, wherein the second detection line is apart from the first detection line in the second direction, and the third detection line is apart from the first detection line in the third direction.

4. The position detection device according to claim 1, wherein the second detection line is apart from the first detection line in the second direction, and the third detection line overlaps the first detection line viewed along the first direction.

5. The position detection device according to claim 1, wherein the third detection line is apart from the first detection line in the third direction, and the second detection line overlaps the first detection line viewed along the first direction.

6. The position detection device according to claim 1, wherein:
- the three second detectors are each different from each of the three first detectors by being at locations different from the three first detectors; and
- the three third detectors are each different from each of the three first detectors and the three second detectors by being at locations different from the three first detectors and the three second detectors.

* * * * *